(No Model.) 2 Sheets—Sheet 2.
D. S. DOYLE.
DENTAL CUSPIDOR.
No. 595,532. Patented Dec. 14, 1897.
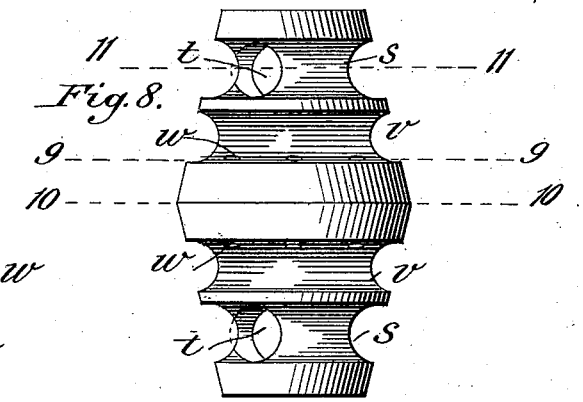
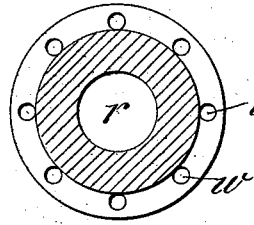
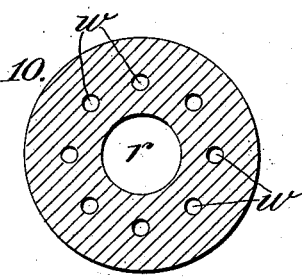
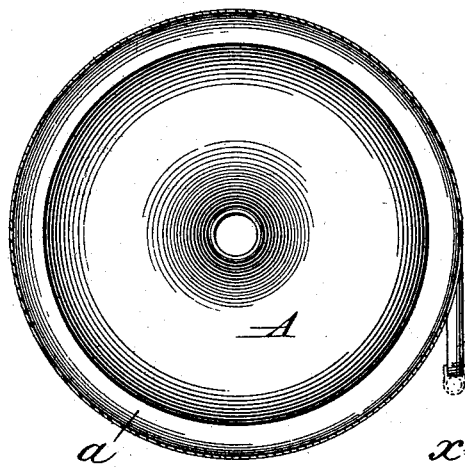
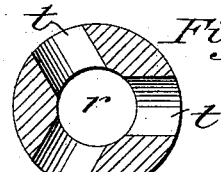
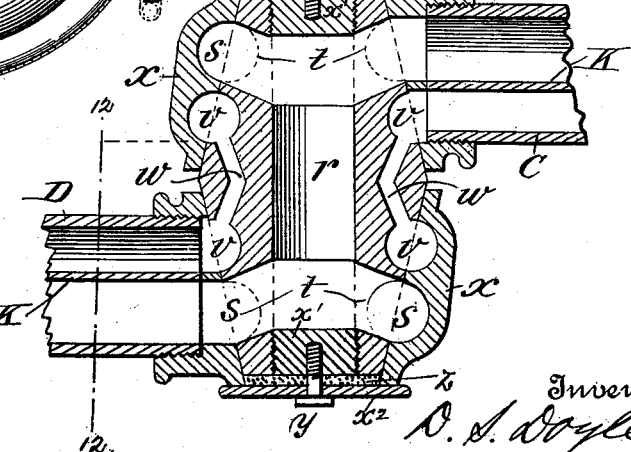
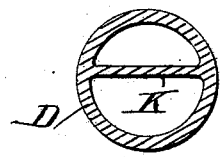
Witnesses
F. H. Schott
A. M. Parkins
Inventor
D. S. Doyle
Munnie Goldsborough
Attorneys
THE NORRIS PETERS CO., PHOTO-LITHO., WASHINGTON, D. C.

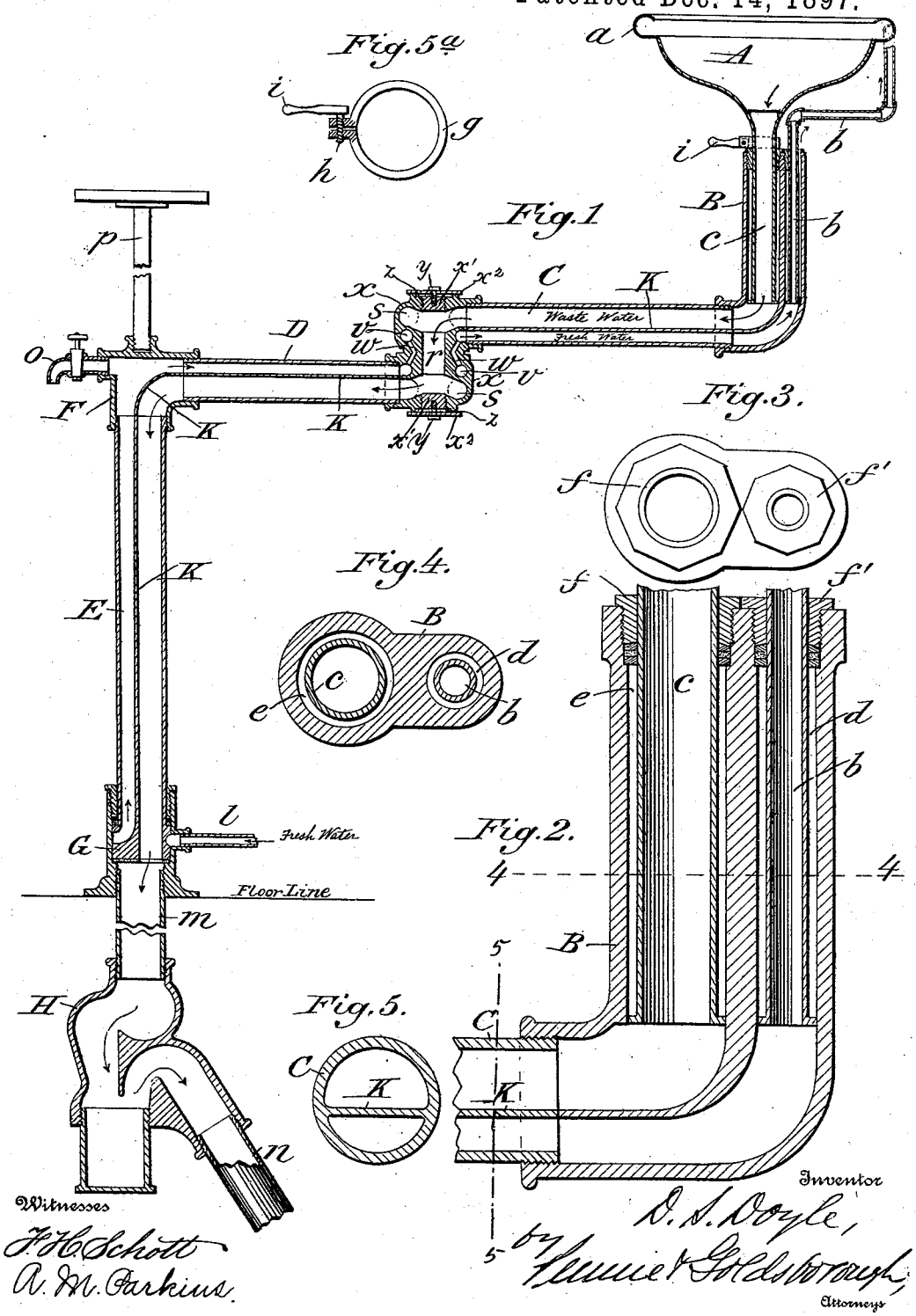

UNITED STATES PATENT OFFICE.

DENNIS S. DOYLE, OF PHILADELPHIA, PENNSYLVANIA, ASSIGNOR TO WILLIAM W. DOYLE, OF SAME PLACE.

DENTAL CUSPIDOR.

SPECIFICATION forming part of Letters Patent No. 595,532, dated December 14, 1897.

Application filed April 3, 1897. Serial No. 630,501. (No model.)

*To all whom it may concern:*

Be it known that I, DENNIS S. DOYLE, a citizen of the United States, residing at Philadelphia, in the county of Philadelphia and State of Pennsylvania, have invented certain new and useful Improvements in Dental Cuspidors; and I do hereby declare the following to be a full, clear, and exact description of the invention, such as will enable others skilled in the art to which it appertains to make and use the same.

My invention relates to certain new and useful improvements in cuspidors for dental use, and is designed to furnish a construction and arrangement of parts economical in point of manufacture, readily adjustable to suit the various requirements of its employment in practice, which may be conveniently and speedily disassembled for transportation or storage or for purposes of repair, and which is not liable to clog or become foul by the accumulation of organic matter within it.

In the accompanying drawings, Figure 1 represents a central vertical section of an apparatus embodying my invention. Fig. 2 represents on a larger scale a sectional view of the upper portion thereof. Fig. 3 represents a top view of the same. Fig. 4 represents a section on the line 4 4 of Fig. 2. Fig. 5 represents a section on the line 5 5 of Fig. 2. Fig. 5ª represents, partly in section, a clamping-collar employed for a purpose hereinafter described. Fig. 6 represents a top plan view of the cuspidor-bowl and its flushing-tube. Fig. 7 represents a vertical sectional view of a joint in the conduit. Fig. 8 represents a side elevation of the core or plug of said joint. Fig. 9 represents a section on the line 9 9 of Fig. 8. Fig. 10 represents a section on the line 10 10 of Fig. 8. Fig. 11 represents a section on the line 11 11 of Fig. 8, and Fig. 12 represents a section on the line 12 12 of Fig. 7.

Similar letters of reference indicate similar parts throughout the several views.

Referring to the drawings, A indicates the cuspidor-bowl, provided with an overhanging rim-flange $a$, forming an annular flushing-channel, into which the water-supply enters tangentially through the flushing-tube $b$, with the result that the water on its way to the exit-pipe $c$ passes over the inner surface of the bowl with a whirling motion peculiarly appropriate for the purpose.

As shown more fully in Figs. 2 to 4, the pipes $b$ and $c$ fit, respectively, within chambers $d$ and $e$ of a casting B, and are capable of longitudinal movement therein, so as to adjust the height of the bowl. At their upper ends the chambers $d$ and $e$ are provided with packing-rings adapted to be compressed into tight contact with the outer periphery of the pipes $b$ and $c$ by means of hollow screw-threaded packing-nuts $f\ f'$, so as to make water-tight joints. One of the pipes, as $c$, is encircled by a split collar $g$, (see Fig. 5ª,) adapted to be drawn together and clamped upon the pipe or released therefrom, as required, by means of the screw-thread $h$, having an operating-handle $i$. In order to adjust the height of the bowl by means of these devices, the bowl may be raised by hand, thereby drawing out the pipes $b$ and $c$ a corresponding distance and then dropping the split collar $g$ until it rests upon the top of the nut $f$, whereupon it is clamped upon the pipe $c$ by giving an appropriate turn to the handle $i$, thus sustaining the bowl at the desired elevation.

Communicating with the casting is the pipe-section C, having a partition K, dividing it into upper and lower compartments, separated from each other and forming continuations of like compartments of the casting B. The pipe-section C is connected to a similar pipe-section D through the intermediacy of a joint, whose particular construction is more fully indicated in Figs. 7 to 11 and which will be hereinafter more fully described.

The pipe-section D is in its turn connected to an upright pipe-section E by means of an elbow-union F, said sections D and E and the elbow-union F being all provided with the partition K, so as to form compartments corresponding to those of the pipe-section C. The lower portion of the pipe-section E fits within a hollow standard G, provided with a water-tight packing. A supply-pipe $l$ admits fresh water from the street-main to one of the compartments of the pipe-section, and the other compartment opens into an exit-pipe $m$, leading to a trap H, from which a pipe $n$ leads to the drain. The elbow-union F may conveniently be provided with a faucet $o$ and with a tool-stand $p$.

The joint for connecting the pipe-sections C and D is shown in detail upon Sheet 2 of the drawings. It consists of a central core having a vertical passage $r$ and annular grooves $s$, which communicate with the passage $r$ by the radial ports $t$, said annular grooves also communicating with the waste-water compartments of the pipe-sections C and D. It is also provided with annular grooves $v$, communicating with each other by the ports $w$ and also communicating with the fresh-water compartments of the pipe-sections C and D. To complete the annular grooves $s$ and $v$, the shells $x$ are correspondingly recessed, as shown, and said shells are held in place by plugs $x'$, screwed into the ends of the passage $r$, and disks $x^2$, secured to the plugs by screws $y$. Washers $z$ are also employed to insure a water-tight joint.

A constant flow of fresh water is maintained, when the apparatus is in use, from the fresh-water inlet $l$ up through the appropriate compartment of the pipe-section and through the grooves $v$ and ports $w$ of the joint to the pipe $b$, and thence into the flushing-rim of the cuspidor-bowl. The return of the waste water is had through the other compartment of the pipe-sections and through the ports $t$ and central passage $r$ of the joint and finally to the trap and drain. It will be apparent that in whichever direction or to whatever degree the pipe-section C may be revolved upon the joint as an axis the flow of water to or from the bowl will not be interrupted, so that the pipe-section may be freely revolved to bring the bowl into the desired position without fear of affecting the water flow. It will also be observed that full facility of exit is given to the waste water by making the capacity of the waste-water conduit or compartment greater than that of the fresh-water conduit or compartment throughout the entire extent of the apparatus. The bowl may be adjusted vertically by means of the collar $g$, as hereinbefore described.

By my invention the bowl has the capacity of movement or adjustment in both a vertical and a horizontal plane without sacrificing the stability of the apparatus and without the employment of flexible india-rubber tubing, which experience has shown to foul readily. Moreover, it is separate from the dental chair, and can be revolved out of the way by a simple manipulation when an operation is proceeding and as readily and quickly restored to place at the moment when it is needed.

I do not restrict myself to the employment of the exact construction shown in the drawings, although I regard it as the best adapted for the purpose, but contemplate such modifications thereof as fairly fall within the scope of mechanical equivalents for the several parts.

Having thus described my invention, what I claim is—

1. A flushing-support for dental cuspidor-bowls, comprising a stand-pipe having separate passages for the inflow of fresh water to the bowl and for the outflow of waste water therefrom, and a supplemental conduit carrying the bowl and having like passages, said conduit having a movable joint upon which the bowl may be revolved laterally without disturbing the stand-pipe.

2. A flushing-support for dental cuspidor-bowls, comprising a conduit having separate passages for the inflow of fresh water to the bowl and for the outflow of waste water therefrom, said conduit having a movable joint upon which the bowl may be revolved laterally, and said joint having a core with external annular recesses and a central bore communicating therewith in the line of passage of the waste water, and having external annular recesses connected with each other by ports exterior to the central bore and in the line of passage of the fresh water.

3. The combination with double-conduit pipe-sections, of a movable joint connecting the same, said joint consisting of a core or plug having annular grooves or recesses at its ends and a central passage communicating with said grooves by radial ports, and having annular grooves or recesses intermediate of the ends and communicating with each other by ports exterior to the central passage, said core or plug tapering conically from its center toward its ends, and having sleeves or jackets to which the pipe-sections are coupled.

4. In flushing apparatus for dental cuspidor-bowls the combination with the bowl having an exit-pipe and an inlet-pipe, of a double conduit in which said pipes fit and in which they are vertically movable and adjustable, and means for retaining them in the desired adjustment.

5. A flushing-support for dental cuspidor-bowls comprising a vertical pipe-section, a horizontal pipe-section coupled thereto, and a pipe-section supporting the bowl and coupled to the preceding section by a movable joint, the said pipe-sections and the joint being all provided with separate inlet and outlet conduits or passages.

In testimony whereof I affix my signature in presence of two witnesses.

DENNIS S. DOYLE.

Witnesses:
WM. R. NEUGEON,
WILLIAM W. DOYLE.